United States Patent [19]

Moline

[11] Patent Number: 5,028,854

[45] Date of Patent: Jul. 2, 1991

[54] VARIABLE SPEED MOTOR DRIVE

[75] Inventor: Gary Moline, Duluth, Minn.

[73] Assignee: The Pillsbury Company, Minneapolis, Minn.

[21] Appl. No.: 472,314

[22] Filed: Jan. 30, 1990

[51] Int. Cl.[5] .................... H02P 7/00

[52] U.S. Cl. .................... 318/434; 388/838

[58] Field of Search .............. 318/432, 434, 450, 452, 318/59, 62, 66, 68, 101, 11; 388/827, 838, 903; 307/326, 327; 361/23, 28, 29, 31, 87

[56] References Cited

U.S. PATENT DOCUMENTS

| | | | |
|---|---|---|---|
| 1,281,347 | 10/1918 | Goldstein | 388/838 |
| 3,388,305 | 6/1968 | Smith | 318/175 |
| 3,938,013 | 2/1976 | Seilly et al. | 318/92 |
| 4,300,079 | 11/1981 | Kawada et al. | 318/390 |
| 4,419,615 | 12/1983 | Muto et al. | 318/811 |
| 4,423,458 | 12/1983 | Stich | 361/87 X |
| 4,575,663 | 3/1986 | Papson et al. | 388/838 |
| 4,623,967 | 11/1986 | Naimer | 364/483 |
| 4,638,879 | 1/1987 | Collonia | 388/838 X |
| 4,727,305 | 2/1988 | Muskovac et al. | 318/798 |
| 4,733,343 | 3/1988 | Yoneda et al. | 364/184 |
| 4,839,570 | 6/1989 | Saganovsky | 388/903 X |
| 4,888,813 | 12/1989 | Penn et al. | 388/838 |

*Primary Examiner*—William M. Shoop, Jr.
*Assistant Examiner*—A. Jonathan Wysocki
*Attorney, Agent, or Firm*—Kinney & Lange

[57] ABSTRACT

A motor drive having a sensing input for sensing fault conditions and a speed control input for receiving a speed control signal. The variable speed motor drive is suitable for being powered by a power supply coupled to a supply input and controls motor speed in a variable speed motor based on the speed control signal such that the motor speed corresponds to the level of the speed control signal. The disclosed motor drive includes a power interrupter, coupled between the supply input and the variable speed motor, for controllably interrupting power to the motor as well a a drive controller coupled to the motor drive for monitoring the sensing input and causing the power interrupter to interrupt power when a fault condition occurs. The drive also provides that speed control signal to the speed control input at a level which stops the motor when a fault condition occurs.

19 Claims, 4 Drawing Sheets

VARIABLE SPEED MOTOR DRIVE

BACKGROUND OF THE INVENTION

The present invention relates to an improved motor drive controller. More particularly, the present invention relates to an improved motor drive controller for controlling a variable speed motor.

Variable speed motors are presently in wide use. Typically, a variable speed motor includes a motor drive for varying the speed of the motor, the motor drive having a speed control input which responds to an analog speed signal. As the level of the speed signal varies, the motor drive increases or decreases the speed of the motor. Therefore, an operator can control the motor speed by providing the analog speed signal, at a desired level, to the speed control input of the motor drive.

Some typical motor drives control motor speed by using armature control. As the speed signal at the speed control input increases, the motor drive increases a voltage level applied to armature windings in the motor. The increased armature voltage causes the rotational velocity of the armature to increase. Similarly, as the speed signal is decreased, the motor drive decreases the voltage level applied to the armature windings and the rotational velocity of the armature decreases.

In the baking industry, variable speed motors are used in a variety of machines for processing dough. One such machine is known as a sheeter in which a large ball of dough is placed on a conveyor and is moved through a series of rollers which roll out the ball of dough and spread it into a sheet of dough having generally uniform thickness. The dough can then be processed in any desired manner.

A second machine which processes dough, and which utilizes a variable speed motor, is a cutter. In a cutter, the sheeted dough is placed on a conveyor and moved through a rotating cutter which cuts the dough into any desired form, such as doughnuts. The cut dough is then collected for further processing.

Both sheeting and cutting require variable speed motors because the sheeting and cutting processes can be done at higher or lower speeds depending on factors such as the volume of dough being sheeted or cut and dough consistency. Also, some dough processing machines perform both cutting and sheeting functions. These machines require variable speed motors because, typically, cutting must be performed at lower speeds than sheeting. Therefore, when the operator is using the machine to cut, the machine must be moving at a slower rate than when the operator is using it to perform the sheeting operation.

Nearly all machines suitable for processing dough have various safety interlocks. For example, when a jam occurs in a sheeter, in order to clear the jam, the operator must lift a roller guard to gain access to the rollers. When the roller guard is lifted, a roller guard safety interlock is tripped. Once the safety interlock is tripped, a power interruption mechanism interrupts power to the motor drive and the motor is turned off.

However, the speed signal provided to the motor drive generally stays at the same level regardless of whether a safety interlock is tripped. Therefore, if the power interruption mechanism should fail, the motor drive will continue driving the motor at a speed corresponding to the level of the speed signal.

Therefore, there is a continuing need for a motor drive controller which ensures that, once a safety interlock is tripped, the motor speed is immediately reduced to zero.

SUMMARY OF THE INVENTION

The present invention is an improvement in a motor drive for varying motor speed of a variable speed motor. The motor drive is of the type having a sensing input for sensing fault conditions and a speed control input for receiving a speed control signal. The variable speed motor is suitable for being powered by a power supply coupled to a supply input, and the motor drive controls motor speed in the variable speed motor based on the speed control signal. The improvement includes a power interrupter which is coupled between the supply input and the variable speed motor. The power interrupter controllably interrupts power to the motor. The improvement also includes a drive controller which is coupled to the motor drive and monitors the sensing input. The drive controller controls the power interrupter to interrupt power when a fault condition occurs. The drive controller also provides the speed control signal to the speed control input in a state which stops the motor when a fault condition occurs.

DETAILED DESCRIPTION OF THE PREFERRED EMBODIMENTS

1. Overview

Figure 1:
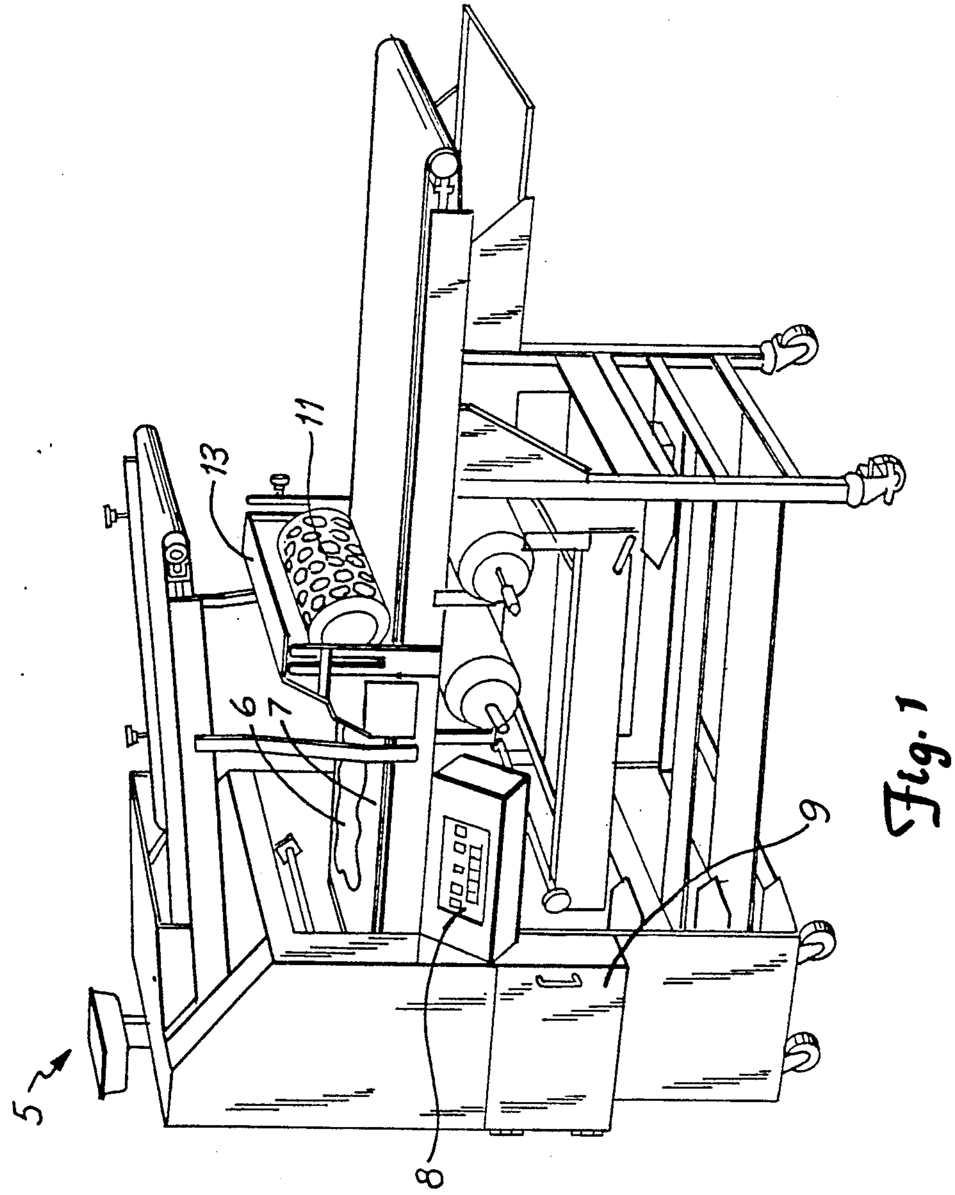
FIG. 1 is a pictorial drawing of a cutter.

FIG. 1 is a pictorial drawing of a cutter 5. An operator places a sheet of dough 6 on a conveyor 7. The operator then enters a desired conveyor speed on a control panel 8. The speed entered by the operator on the control panel 8 causes a variable speed conveyor motor mounted within chassis door 9 to move the conveyor 7 at a desired speed. As the conveyor 7 moves, the sheet of dough 6 moves under a cutting drum 11 and is cut into desired shapes and sizes.

The cutting drum 11 is, typically, provided with a cutter guard 13 which guards the cutter so that the operator cannot be caught by the cutter drum 11 as it rotates. A safety interlock (described in greater detail later) is typically coupled to the cutter guard 13 so that, if the operator raises the cutter guard 13 to gain access to the cutter drum 11, the motor housed within the chassis door 9 is stopped.

2. A Motor Drive System

Figure 2:
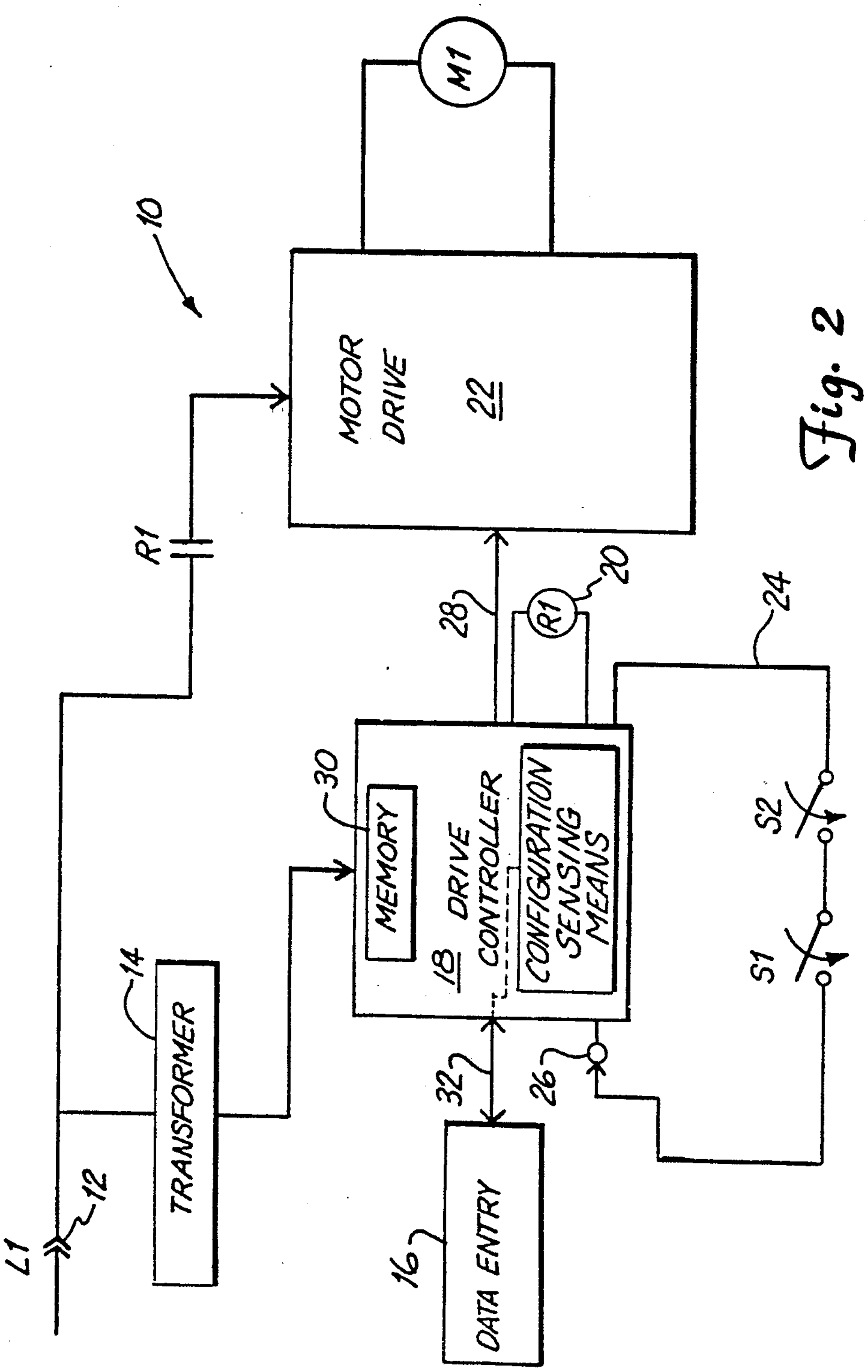
FIG. 2 is a block diagram showing a motor drive system in accordance with the present invention.

FIG. 2 is a block diagram of a motor drive system 10 in accordance with the present invention used to drive the variable speed conveyor motor. The motor drive system 10 includes a power supply input 12, a transformer 14, a data entry apparatus 16, a drive controller 18, a relay coil 20, a relay R1, a feedback circuit 24 with switches S1 and S2, a motor drive 22 and an armature winding M1. Power, typically in the form of an AC line voltage L1, is coupled to the power supply input 12. The line voltage L1 is applied to the transformer 14 and the relay R1. The transformer 14 is a step-down transformer which steps down the line voltage L1 and provides power to the drive controller 18. The line voltage L1 is also applied to the motor drive 22 through the relay R1, thereby supplying power to the motor drive 22.

The data entry apparatus 16 is typically a control panel, such as the control panel 8 shown in FIG. 1, including a membrane keyboard which communicates with the drive controller 18. The data entry apparatus 16 can be configured in several ways depending on the particular type of machine in which it is installed. For example, where the data entry apparatus 16 is used in a sheeter, the speed data entered by the operator may correspond to a different motor speed than when it is used in a cutter or moulder since cutting is typically done at slower speeds than sheeting. Therefore, upon power-up, the drive controller 18 senses the configuration of the data entry apparatus which it is coupled to by sensing an identification signal provided by the data entry apparatus 16. In this embodiment, the data entry apparatus 16 is configured to be installed in the cutter 5 shown in FIG. 1.

Next, an operator enters a speed using the data entry apparatus 16. The data entry apparatus 16, in turn, provides a speed signal to the drive controller 18. Upon receiving the speed signal, the drive controller 18 determines whether all the safety interlocks are closed by monitoring the feedback circuit 24 at a sensing input (or feedback input) 26. In this embodiment, the safety interlocks include safety interlock switches S1 and S2 which are coupled to the cutter guard 13 and the chassis door 9 (both shown in FIG. 1), respectively. If the safety interlocks are closed, then the drive controller 18 energizes the relay coil 20 which causes the relay R1 to close. This provides the line voltage L1 to the motor drive 22. Then, the drive controller 18 provides a speed control signal to the motor drive 22 via a conductor 28 based upon the motor speed selected by the operator at the data entry apparatus 16 and also based upon the configuration of the data entry apparatus 16 determined by the drive controller 18 upon power-up.

When the motor drive 22 is supplied with a line voltage L1 and receives the speed control signal from the drive controller 18, the motor drive 22 applies a voltage across the armature winding M1 as a function of the level of the speed control signal received from the drive controller 18. The voltage applied to the armature winding M1, in turn, causes rotation of a motor armature at the desired speed selected by the operator.

3. Emergency Shutdown

It should be noted that any number of safety interlocks can be utilized in any appropriate form on the particular dough processing machine in which the motor drive system 10 is installed. For example, the switch S1 may be coupled to a roller guard on a sheeter which the operator must raise in order to gain access to the rollers. When the roller guard is raised by the operator, switch S1 would open and break the feedback circuit 24. In the context of the cutter illustrated in FIG. 1, the switch S1 may be coupled to the cutter guard 13. When the cutter guard 13 is raised, switch S1 opens thereby breaking the feedback circuit 24. Also, in this chassis door 9 (also shown in FIG. 1) which must be opened for the operator or a maintenance person to gain access to the motor or chain drives in the dough processing machine. When the chassis door 9 is opened, switch S2 opens thereby breaking the feedback circuit 24 to the drive controller 18.

The drive controller 18 continuously monitors the feedback input 26 to ensure that none of the safety interlock switches are open. However, in the event that any of the safety interlock switches do open, and the feedback circuit 24 is broken, the drive controller 18 immediately performs two operations. The drive controller 18 de-energizes the relay coil 20 thereby causing the relay R1 to open interrupting power to the motor drive 22. Also, the drive controller 18 reduces the speed control signal applied via conductor 28 to zero This ensures that, even if the relay R1 sticks closed, the motor drive 22 will reduce the voltage applied across the armature Ml to zero, thereby stopping rotation of the variable speed motor.

4. Restarting

Once the safety interlock has been reset and switches S1 and S2 are closed, the drive controller 18 awaits a Restart signal from the data entry apparatus 16 before it re-energizes the relay coil 20 and re-applies the speed control voltage via conductor 28. Therefore, the operator cannot simply close the cutter guard 13 or the chassis door 9 and have the motor immediately restart. This substantially ensures that the motor will not restart until the operator is entirely ready for it to restart.

The drive controller 18 may also include a memory 30. The memory 30 stores data representative of the speed selected by the operator at the data entry apparatus 16 prior to the time when the safety interlock was tripped. Therefore, once the safety interlock is reset and the drive controller 18 is ready to restart, the operator need only hit a start button at the data entry apparatus 16 and the drive controller 18 will re-energize the relay coil 20 and determine which speed control voltage was last applied via conductor 28 based on the information stored in the memory 30. The drive controller 18 then applies the last speed control voltage entered by the operator before the safety interlock or fault condition arose. This is a convenience feature which eliminates the need for the operator to re-enter a desired motor speed each time a safety interlock or fault condition occurs.

If power is removed from the drive controller 18 (i.e., if the line voltage L1 is ever decoupled from power input 12) upon power being re-applied, drive controller 18 detects the power interruption, determines the type of data entry apparatus it is coupled to and stores the lowest speed selectable by that particular data entry apparatus in memory 30. Then, if the operator subsequently enters a Run command at the data entry apparatus 16 without entering a new desired speed, the drive controller 18 energizes relay coil 20 and provides the motor drive 22 with a speed control voltage, via conductor 28, corresponding to the lowest speed selectable at the data entry apparatus 16. In other words, the drive controller 18 defaults to the lowest selectable speed after power has been interrupted. The operator can then adjust the speed upward if desired.

5. Operation

Figure 3:
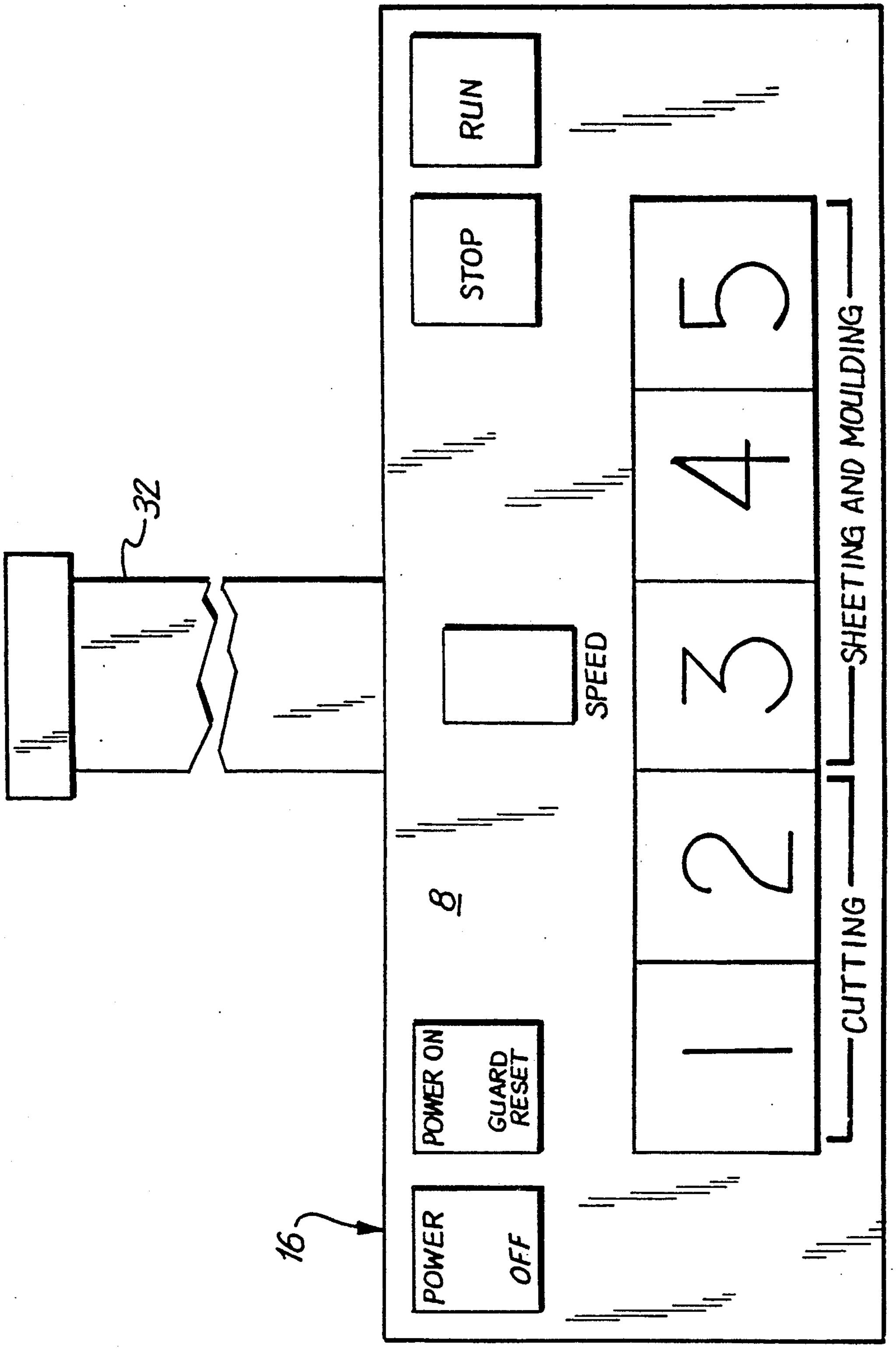
FIG. 3 is a drawing of a typical face plate used with an operator data entry apparatus.

FIG. 3 is a drawing of a typical control panel 8 for a membrane data entry apparatus 16. FIG. 3 shows that the data entry apparatus 16 includes a Power Off button, a Power On/Guard Reset button, a speed indicator, a Run button, a Stop button and five discreet speed selector buttons. The data entry apparatus 16 is typically coupled to the drive controller 18 and transmits the various command signals via a ribbon connector 32.

Figure 4:
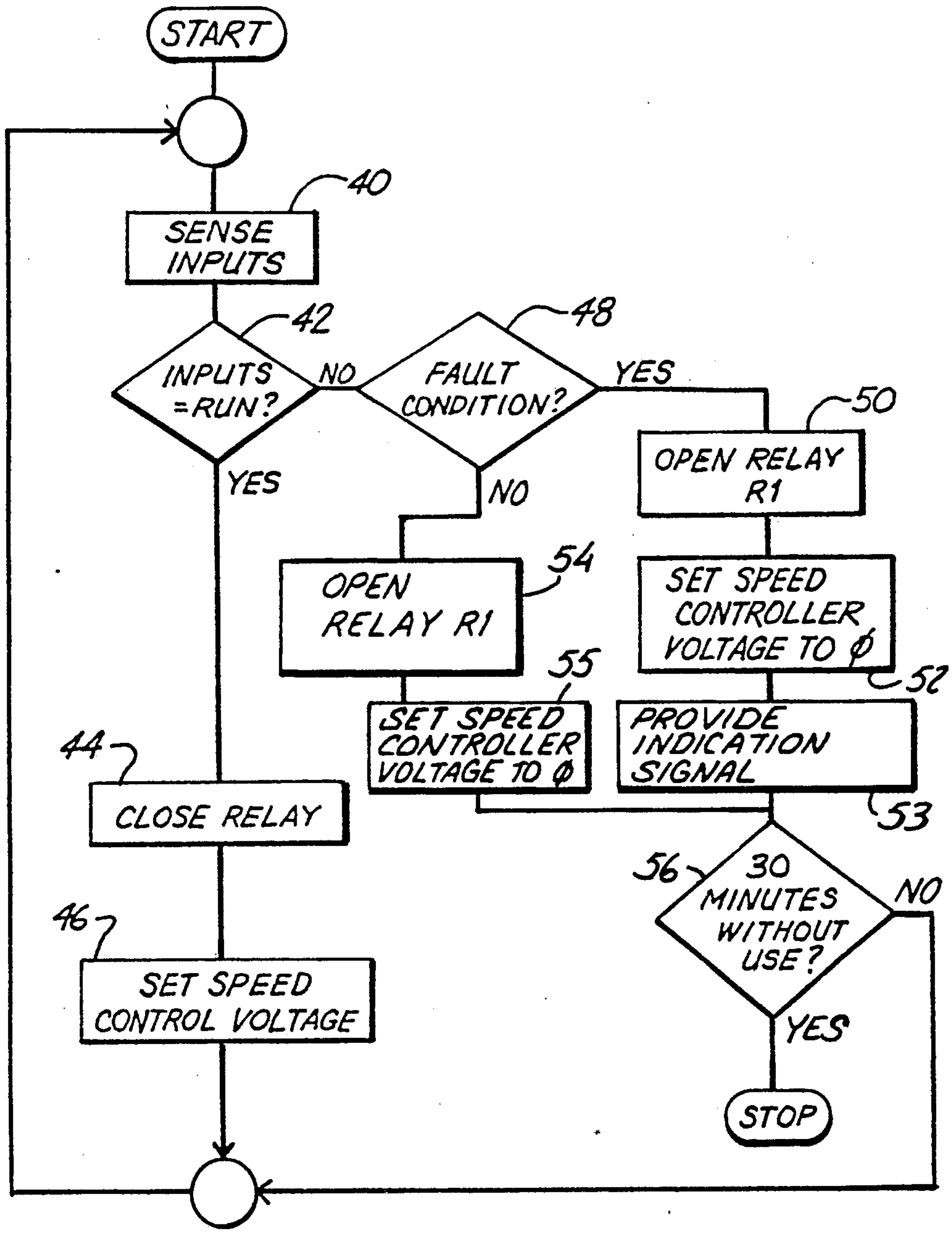
FIG. 4 is a flow diagram showing the operation of the motor drive system shown in FIG. 2.

FIG. 4 is a flow diagram of the operation of the motor drive system 10 shown in FIG. 2. The drive controller 18 begins by sensing the feedback input 26 and the inputs from the ribbon connector 32. This is indicated by block 40. The drive controller 18 then determines whether the particular combination of inputs sensed are proper to begin the motor running. In other words, the drive controller 18 determines whether all of the safety interlock switches (S1 and S2, for example) are closed, and determines whether the operator has entered a desired motor speed 1 through 5 at the data entry apparatus 16 and whether the operator has entered the Run command by depressing the Run button at the data entry apparatus 16. If those conditions are all met, the drive controller 18 energizes the relay coil 20 thereby closing the relay R1 and applying the line voltage L1 to the motor drive 22. This is indicated by blocks 42 and 44.

Next, the drive controller 18 sets the speed control voltage via the conductor 28 to a desired voltage level based upon the speed command entered by the operator at the data entry apparatus 16. This causes the motor drive 22 to apply a voltage (the level of which is based on the speed command entered by the operator) to the armature winding M1 which, in turn, causes the armature to rotate at a desired speed. This is indicated by block 46.

If the inputs from the ribbon connector 32 and the feedback input 26 indicate to the drive controller 18 that the motor is not ready to be started, the drive controller 22 determines whether it has simply received a Stop signal or a Power Off signal from the data entry apparatus 16 or whether a fault condition exists in the dough processing machine. By sensing the feedback input 26, the drive controller 18 determines whether a fault condition exists. This is indicated by block 48. If a fault condition exists, for example if the cutter guard 13 is raised, then the drive controller 18 de-energizes the relay coil 20 thereby opening the relay R1 and removing power from the motor drive 22. This is indicated by block 50. Also, however, the drive controller 18 reduces the speed control voltage applied via the conductor 28 to zero. This is indicated by block 52. Reduction of the speed control voltage to zero causes the motor drive 22 to reduce the voltage applied to the armature winding M1 to zero even if the relay R1 sticks and power is still applied to the motor drive 22. Then, controller 18 provides a fault indication signal to indicate to the operator that a fault condition exists. In this preferred embodiment, the fault indication signal is provided to data entry apparatus 16 via connector 32 and causes the speed indicator to blink. This is indicated in block 53.

If, in block 48, the drive controller 18 determines that no fault condition exists, but it simply received a Stop command from the data entry apparatus 16, then the drive controller 18 merely opens relay R1, and reduces the speed control voltage to zero thereby stopping the motor. This is indicated in blocks 54 and 55.

As an energy saving technique, the drive controller 18 then determines whether it has been sitting idly, without the operator having entered any new data at the data entry apparatus 16, for 30 minutes or more. If so, the drive controller 18 goes into a power shutdown mode to save energy. This is indicated in block 56.

If, however, it has not been sitting idly for 30 minutes, the drive controller 18 again senses the inputs 26 and 32 to determine whether the input combination indicates that the motor is ready to run. For example, if the operator has remedied the problem which required raising the cutter guard 13, and has sent a Guard Reset command via the data entry apparatus 16, and also sent a Run command, then the drive controller 18 retrieves the previous speed setting from the memory 30. The drive controller 18 then energizes the relay coil 20 and applies the previous speed control voltage, via conductor 28, thereby restarting the motor at the previously desired speed.

Also, the operator can send a Guard Reset command, set a new speed, then send a Run command and the drive controller 18 starts the motor at the new desired speed. The drive controller 18 then stores the new desired speed in the memory 30 so that, if a safety interlock is tripped and remedied, the drive controller 18 can restart the motor at the new desired speed without requiring the operator to re-enter that speed.

CONCLUSION

The present invention ensures that motor speed is reduced to zero when a safety interlock is tripped. By reducing the speed control voltage, via conductor 28, to zero, the motor drive 22 reduces motor speed to zero even if the relay R1 sticks.

It should be noted that, although the present invention is described with reference to a DC motor drive where speed is varied by varying armature voltage, the present invention could be implemented in other variable speed motors such as an AC induction motor drive. In that case, motor speed is varied by varying the frequency of the AC power source supplied to the AC motor. As in the DC drive application, the power frequency provided to the AC motor is dependent on the speed control signal provided to the adjustable frequency drive by the drive controller 18. Hence, the present invention would reduce an AC motor's speed to zero by disconnecting the AC motor from its power source and reducing the speed control signal to zero as a result of a stop command or interruption of a safety interlock.

The drive controller of the present invention also provides several other techniques to make operation of the dough processing equipment easier and more convenient. For example, the data entry apparatus 16 is provided which has several discrete speed selector buttons for operator selection of motor speed. Also, the drive controller 18 contains the memory 30 for storing the most recent operator speed selection. This allows the drive controller 18 to restart the motor at the desired speed after an emergency shutdown without requiring the operator to re-enter the desired speed.

The drive controller 18 senses the inputs from the ribbon cable 32 to determine which type of data entry apparatus 16 it is coupled to. Therefore, the drive controller 18 can be used in a variety of different dough processing machines and it adjusts its speed control voltage levels accordingly. This provides the drive controller 18 with great flexibility and cost efficiency.

In addition, the drive controller 18 is capable of sensing when the power supply has been decoupled from the supply input 12. Upon initial power-up, then, the drive controller 18 defaults to providing the speed control voltage, via conductor 28, which corresponds to the lowest discrete motor speed selectable at the data entry apparatus 16 on the machine in which it is employed. This allows the operator to increase speed, if desired, without having to initially enter any desired motor speed.

Although the present invention has been described with reference to preferred embodiments, workers skilled in the art will recognize that changes may be made in form and detail without departing from the spirit and scope of the invention.

What is claimed is:

1. In a motor drive of the type having a sensing input for sensing fault conditions and a speed control input for receiving a speed control signal and varying the speed of a variable speed motor based on the speed control signal, the variable speed motor being adapted for connection to a power supply coupled to a supply input with the motor drive controlling motor speed in the variable speed motor based on the speed control signal such that the motor speed corresponds to the level of the speed control signal, the improvement comprising:

a power interrupter, coupled between the supply input and the variable speed motor, for controllably interrupting power to the motor; and a drive controller, coupled to the motor drive, for monitoring the sensing input, for controlling the power interrupter to interrupt power when a fault condition occurs, and for providing the speed control signal to the speed control input at a level to stop the motor when a fault condition occurs.

2. The motor drive of claim wherein the improvement further comprises:

a data entry apparatus capable of providing the drive controller with desired control data from an operator.

3. The motor drive of claim 2 wherein the data entry apparatus comprises:

a plurality of discrete speed selectors coupled to the drive controller, each discrete speed selector causing the drive controller to be provided with a speed selection signal when the discrete speed selector is activated, the speed selection signal varying with activation of different discrete speed selectors and corresponding to a desired motor speed associated with the activated discrete speed selector, and wherein the drive controller provides the speed control signal based on the speed selection signal.

4. The motor drive of claim 3 wherein the data entry apparatus further comprises:

a run/stop switch having a run state and a stop state for selectively causing the drive controller to start and stop the motor drive at the desired motor speed.

5. The motor drive of claim 4 wherein the data entry apparatus further comprises:

a memory for storing selector data representative of the discrete speed selector activated; and means for updating the memory each time a different discrete speed selector is activated to contain selector data corresponding to that discrete speed selector.

6. The motor drive of claim 5 wherein the drive controller provides the speed control signal corresponding to the selector data stored in the memory when the run/stop switch is set to the run state.

7. The motor drive of claim 6 wherein the drive controller is suitable for being coupled to a controller power supply at a controller supply input, and wherein the data entry apparatus further comprises:

detection means for detecting decoupling of the drive controller from the controller supply; and means for providing the drive controller with the speed control signal at a level corresponding to the slowest discrete speed when the run/stop switch is set to the run state and when the detection means detects that the drive controller has been decoupled from the controller supply since the run/stop switch was last set to the run state.

8. The motor drive of claim 3 wherein the data entry apparatus is capable of being configured in a plurality of configurations each having different discrete speeds associated with the discrete speed selectors.

9. The motor drive of claim 8 wherein the drive controller comprises:

means for sensing the configuration of the data entry apparatus; and means for adjusting the speed control signal to correspond to the configuration of the data entry apparatus.

10. In an apparatus suitable for use in processing dough and being driven by a variable speed motor of the type having a motor drive with a sensing input for sensing fault conditions in the apparatus and having a speed control input for receiving a speed control signal, the motor drive driving the motor at a speed as a function of the speed control signal, the improvement comprising:

a power interrupter, coupled to the variable speed motor, for controllably interrupting power to the motor; and a drive controller, coupled to the motor drive, for monitoring the sensing input, for controlling the power interrupter to interrupt the power when a fault condition occurs, and for providing the speed control signal to the motor drive at the speed control input in a state to stop the motor when a fault condition occurs.

11. The apparatus of claim 10 wherein the improvement further comprises:

a data entry apparatus capable of providing the drive controller with desired control data from an operator.

12. The motor drive of claim 11 wherein the data entry apparatus comprises:

a plurality of discrete speed selectors, coupled to the drive controller, each discrete speed selector causing the drive controller to be provided with a speed selection signal when the discrete speed selector is activated, the speed selection signal varying with activation of different discrete speed selectors and corresponding to a desired motor speed associated with the activated discrete speed selector, and wherein the drive controller provides the speed control signal based on the speed selection signal.

13. The motor drive of claim 12 wherein the data entry apparatus further comprises:

a run/stop switch having a run state and a stop state for selectively causing the drive controller to start and stop the motor drive at the desired motor speed.

14. The motor drive of claim 13 wherein the data entry apparatus further comprises:

a memory for storing selector data representative of the discrete speed selector activated; and means for updating the memory each time a different discrete speed selector is activated to contain selector data corresponding to that discrete speed selector.

15. The motor drive of claim 14 wherein the drive controller provides the speed control signal corresponding to the selector data stored in the memory when the run/stop switch is set to the run state.

16. The motor drive of claim 15 wherein the drive controller is suitable for being coupled to a controller supply at a controller supply input, and wherein the data entry apparatus further comprises:

detection means for detecting decoupling of the drive controller from the controller supply; and means for providing the drive controller with the speed control signal at a level corresponding to the slowest discrete speed when the run/stop switch is set to the run state and when the detection means detects that the drive controller has been decoupled from the controller supply since the run/stop switch was last set to the run state.

17. The motor drive of claim 12 wherein the data entry apparatus is capable of being configured in a plurality of configurations each having different discrete speeds associated with the discrete speed selectors.

18. The motor drive of claim 17 wherein the drive controller comprises:

means for sensing the configuration of the data entry apparatus; and means for adjusting the speed control signal to correspond to the configuration of the data entry apparatus.

19. The motor drive of claim 10 and further comprising:

a fault indicator, coupled to the drive controller, the fault indicator indicating when a fault condition is sensed by the drive controller.

* * * * *

UNITED STATES PATENT AND TRADEMARK OFFICE
CERTIFICATE OF CORRECTION

PATENT NO. : 5,028,854

DATED : July 2, 1991

INVENTOR(S) : Gary L. Moline

It is certified that error appears in the above-identified patent and that said Letters Patent is hereby corrected as shown below:

Col. 7, line 30, delete "claim", insert --claim 1--.

Signed and Sealed this

Nineteenth Day of January, 1993

*Attest:*

DOUGLAS B. COMER

*Attesting Officer*

*Acting Commissioner of Patents and Trademarks*